(12) United States Patent
Peyron

(10) Patent No.: US 11,959,439 B2
(45) Date of Patent: Apr. 16, 2024

(54) THRUST REVERSER PROVIDED WITH CABLE KINEMATICS FOR SCOOP FLAPS

(71) Applicant: Safran Nacelles, Gonfreville l'Orcher (FR)

(72) Inventor: Vincent Peyron, Moissy Cramayel (FR)

(73) Assignee: Safran Nacelles, Gonfreville l'Orcher (FR)

( * ) Notice: Subject to any disclaimer, the term of this patent is extended or adjusted under 35 U.S.C. 154(b) by 9 days.

(21) Appl. No.: 17/685,649

(22) Filed: Mar. 3, 2022

(65) Prior Publication Data

US 2022/0186684 A1   Jun. 16, 2022

Related U.S. Application Data

(63) Continuation of application No. PCT/FR2020/051525, filed on Sep. 3, 2020.

(30) Foreign Application Priority Data

Sep. 5, 2019 (FR) .................................... 19/09779

(51) Int. Cl.
   *F02K 1/76* (2006.01)
   *F02K 1/72* (2006.01)

(52) U.S. Cl.
   CPC ............... *F02K 1/72* (2013.01); *F02K 1/763* (2013.01); *F05D 2250/34* (2013.01); *F05D 2260/50* (2013.01)

(58) Field of Classification Search
   CPC ... F02K 1/70; F02K 1/72; F02K 1/763; F05D 2260/50
   See application file for complete search history.

(56) References Cited

U.S. PATENT DOCUMENTS

| 4,922,712 A | 5/1990 | Matta et al. |
| 5,309,711 A * | 5/1994 | Matthias ................... F02K 1/72 239/265.29 |

(Continued)

FOREIGN PATENT DOCUMENTS

| FR | 2974150 | 10/2012 |
| RU | 2522017 C2 | 7/2014 |

(Continued)

OTHER PUBLICATIONS

International Search Report for International Application No. PCT/FR2020/051525, dated Dec. 22, 2020.

(Continued)

*Primary Examiner* — Andrew H Nguyen
(74) *Attorney, Agent, or Firm* — Burris Law, PLLC

(57) ABSTRACT

A thrust reverser includes a diverter configured to divert at least a portion of an air flow from a nacelle and a cowl movable relative to an outer fixed structure of the thrust reverser. The thrust reverser further includes at least one rotatably hinged flap. The cowl configured to move from a closure position in which it provides aerodynamic continuity of the nacelle with the flap and covers the diverter. The flap is movable from a retracted position to an opening position in which it opens a passage in the nacelle and uncovers the diverter. The flap obstructs a portion of an annular channel of the nacelle when in the opening position. The thrust reverser also includes a cable-pulley system for driving the flap. The cable-pulley system includes at least one cable associated with at least one pulley to connect the flap to the thrust reverser.

14 Claims, 9 Drawing Sheets

(56) References Cited

U.S. PATENT DOCUMENTS

| | | | | |
|---|---|---|---|---|
| 2015/0267641 A1* | 9/2015 | Gormley | ................ | F02K 1/766 |
| | | | | 239/265.19 |
| 2016/0131082 A1* | 5/2016 | Gormley | ................ | F02K 1/766 |
| | | | | 239/265.19 |
| 2016/0363097 A1* | 12/2016 | Foutch | ................... | F02K 1/763 |
| 2017/0328304 A1* | 11/2017 | Gormley | .................. | F02K 1/72 |
| 2021/0207558 A1* | 7/2021 | Bellet | .................... | F02K 1/763 |

FOREIGN PATENT DOCUMENTS

| | | |
|---|---|---|
| RU | 2688082 C2 | 5/2019 |
| WO | 2011073558 | 6/2011 |

OTHER PUBLICATIONS

Search Report issued in corresponding Russian Application No. 2022103841, completed Oct. 13, 2023, 2 pages.

* cited by examiner

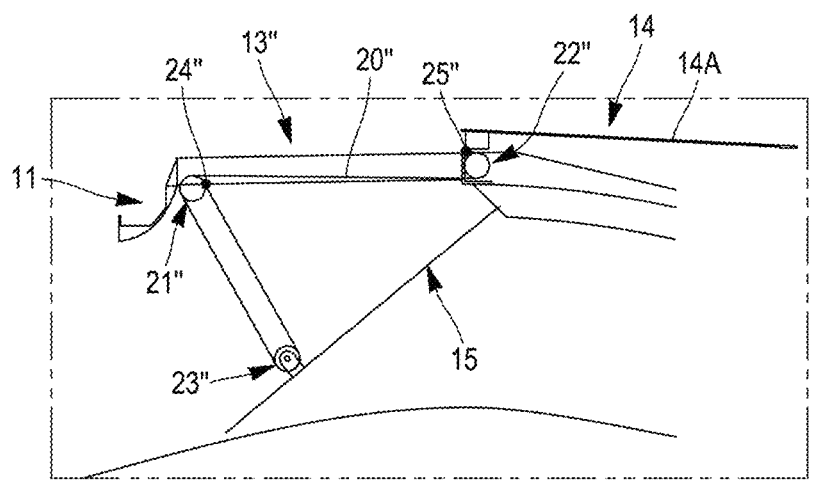

THRUST REVERSER PROVIDED WITH CABLE KINEMATICS FOR SCOOP FLAPS

CROSS-REFERENCE TO RELATED APPLICATIONS

This application is a continuation of International Application No. PCT/FR2020/051525, filed on Sep. 3, 2020, which claims priority to and the benefit of FR 19/09779 filed on Sep. 5, 2019. The disclosures of the above applications are incorporated herein by reference.

FIELD

The present disclosure relates to a thrust reverser for an engine of an aircraft.

BACKGROUND

The statements in this section merely provide background information related to the present disclosure and may not constitute prior art.

An aircraft is propelled by several turbojet engines each housed in a nacelle also accommodating a set of auxiliary actuating devices relating to operation thereof and providing various functions when the turbojet engine is operating or shut down. In particular, these auxiliary actuating devices comprise a thrust reverser. A nacelle generally has a tubular structure comprising an air inlet upstream of the turbojet engine, a middle section configured to surround a fan of the turbojet engine, a downstream section accommodating the thrust reverser and configured to surround the combustion chamber of the turbojet engine, and generally terminates in an ejection nozzle whose outlet is located downstream of the turbojet engine. Modern nacelles are configured to accommodate a bypass turbojet engine adapted to generate, through the blades of the rotating fan, a hot air flow (also called primary flow) from the combustion chamber of the turbojet engine, and a cold air flow (secondary flow) which circulates outside the turbojet engine through an annular passage, also called flow path, formed between a fairing of the turbojet engine and an inner wall of the nacelle. Both air flows are ejected from the turbojet engine by the rear of the nacelle.

The role of a thrust reverser is, during landing of an aircraft, to improve braking capability thereof by redirecting forward at least part of the thrust generated by the turbojet engine. In this phase, the thrust reverser device obstructs the cold air flow and directs the latter towards the front of the nacelle, thereby generating a counter-thrust which is added to the braking of the wheels of the aircraft. The means implemented to achieve this reorientation of the cold flow vary according to the thrust reverser device type.

However, in all cases, the thrust reverser comprises movable cowls that may be displaced between, on the one hand, an opening position in which they open into the nacelle a passage configured for the diverted flow, and on the other hand, a closure position in which they close this passage. These cowls may fulfill a diverting function or simply a function of activating other diverters. In the case of a thrust reverser with cascade vanes, the reorientation of the air flow is performed by cascade vanes, the cowl having only one simple sliding function aiming at uncovering or covering these thrust reverser cascades. Complementary blocking doors, also called flaps, activated by the sliding of the cowling, generally allow a closure of the flow path downstream of the cascades so as to allow the reorientation of the cold flow towards the cascades.

These flaps are pivotally mounted on the sliding cowl between a retracted position in which they provide, with said movable cowl, the aerodynamic continuity of the inner wall of the nacelle and a deployed position in which, in a thrust reversal situation, they obstruct at least partially the annular channel in order to divert a gas flow towards the cascade vanes uncovered by the sliding of the movable cowl. The pivoting of the flaps is guided by connecting rods attached, on the one hand, to the flap, and on the other hand, to a fixed point of the fairing of the turbojet engine delimiting the annular channel.

Such a configuration of the prior art has several problems, namely, in particular, problems of different opening kinematics between the translation of the cowling and the pivoting of the flaps, problems of aerodynamic disturbances due to the drive connecting rods crossing the flow path, problems in acoustic performance due to the installation of fixed hinge points which reduces the surface of the inner structure that may be used for acoustic treatment and mechanical problems due to the mechanical linkage by the connecting rods between the thrust reverser and the inner structure.

The issue of the kinematics of the opening degree of the flaps in relation to the sliding of the cowl and consequently of the management of the air passage total section is a particularly important point. Indeed, during a transition phase between opening and closure of the thrust reverser, the opening of the flaps, at the beginning of the opening phase of the movable cowl, is faster than the recoil of said cowl. There is often a sensitive kinematic point which places the flap in the position of partial obstruction of the annular channel without the obstructed section being completely compensated by the upstream section uncovered by the recoil of the movable cowl. The upstream section of passage through the cascades of the thrust reverser being smaller than the section of the flow path which is obstructed by the flaps, this results in an increase in the pressure in the engine, which implies a delicate management of the turbojet engine speed in this transitional phase. Several solutions have been introduced to solve one or more of these problems.

Thus, it is known to suggest a thrust reverser architecture that no longer comprises a connecting rod passing through the annular channel. For example, this objective can be achieved by providing drive connecting rods articulated on the movable flap and connected near the rear frame of the cascade vanes. However, such an architecture is unsuitable for turbojet engines with a high bypass ratio. Indeed, with this type of turbojet engine, the length of the cascades and consequently the displacement of the cowl downstream of the nacelle to uncover them must be significant. Yet, due to a lack of space available in the nacelle, the length of the connecting rods may not be sufficient to achieve opening kinematics suitable for the flaps and the cowl. This results in that the flap deploys very rapidly in the annular channel from the beginning of the recoil stroke of the sliding cowl causing a consequent increase in pressure in the annular channel. It therefore does not solve the problem of the adequate management of the total section of air passage in the nacelle.

Consequently, there is a need to improve thrust reversers without connecting rods in the annular channel in order to overcome the limitations mentioned above.

SUMMARY

This section provides a general summary of the disclosure and is not a comprehensive disclosure of its full scope or all of its features.

The present disclosure provides a thrust reverser without a connecting rod in the annular channel suitable for turbojet engines with a high bypass ratio responding to the problems previously raised.

The present disclosure also provides a thrust reverser without a connecting rod in the annular channel having a system for driving the blocking flaps that is simple and reliable.

The present disclosure also provides a thrust reverser without a connecting rod in the annular channel in which the kinematics of opening of the flaps and of the sliding cowl during the thrust reversal are controlled in order to provide a total section of exhaust that is always sufficient relative to the air inlet section.

It is also desirable to suggest a thrust reverser without a connecting rod in the annular channel in which the kinematics of opening of the flaps and of the cowl is simultaneous.

The present disclosure also provides a thrust reverser without a connecting rod in the annular channel in which the impact of drive system of the flaps on the structure of the movable cowl is limited.

The present disclosure provides a thrust reverser for a turbojet engine nacelle comprising means for diverting at least portion of an air flow from the turbojet engine, and at least one cowl movable in translation relative to an outer fixed structure of the thrust reverser. The thrust reverser has at least one rotatably hinged flap. The movable cowl being capable of moving alternately from a closure position in which it provides the aerodynamic continuity of the nacelle with the flap and covers the diverter, the flap being in the retracted position, to an opening position in which it opens a passage in the nacelle and uncovers the diverter, the flap obstructing a portion of an annular channel of the nacelle.

The thrust reverser is advantageous in that it comprises a cable-pulley system for driving the flap.

The obstruction by the flap of a portion of the annular channel of the nacelle makes it possible to direct, towards the diverter, the flow of air crossing the annular channel.

The flap is advantageously rigid, preferably formed by a solid wall. The solid wall advantageously forms an aerodynamic surface.

Thanks to the present disclosure, the flap drive connecting rods put in place in the annular channel of the nacelle forming an air flow may be eliminated and the kinematics of opening of the flap and of the cowl is controlled in order to have an air exhaust section in the nacelle that is substantially constant, in particular when the thrust reverser device is in a start-of-transit configuration in which the opening of the diverter by translation of the movable cowl is small.

The outer fixed structure is advantageously a fixed structure of aerodynamic continuity with the nacelle in the closure position of the movable cowl.

Preferably, the cable-pulley system comprises at least one cable associated with at least one pulley to connect the flap to the thrust reverser.

It should be understood that one end of the cable is connected to the movable cowl and the other end of the cable is connected to the fixed structure or alternatively to the diverter.

According to one form, the cable-pulley system is mounted on the thrust reverser so as to tension the cable when the thrust reverser is in the closure position and release the cable when the thrust reverser begins its opening phase, preferably up to a deployed position of the flap. By "release" it should be understood that a tension is released on the cable to allow the progressive deployment of the flap. The displacement of the movable cowl between the opening position and the closure position then makes it possible to progressively authorize the deployment or the retraction of the flap.

According to another form, the ends of the cable and at least one deflection pulley of the cable-pulley system link together the fixed structure, the movable cowl and the flap. Advantageously, the cable of the cable-pulley system may be secured at one end to the outer fixed structure and it may be secured, at the other end, to the movable cowl.

According to yet another form, the flap is hinged at its downstream end.

According to one form, the thrust reverser comprises a torsion spring of the flap preferably disposed at the hinge of the flap with the cowl.

According to another form, the movable cowl comprises a stop provided to limit, in the event of breakage of the cable, the stroke of the flap to its deployed position corresponding to the opening position of the thrust reverser. Preferably, the stop is disposed at the hinge of the flap with the movable cowl.

According to yet another form, the flap comprises a hooking member provided to engage with a receiving member of the outer fixed structure and provided to guide the stroke of the flap and lock the flap in the retracted position. This advantageously makes it possible to avoid any untimely opening in flight in the event of the breakage of the cable. The receiving member is advantageously formed on the outer fixed structure of the thrust reverser. The receiving member is advantageously located close to the diverting edge of the outer fixed structure of the thrust reverser. The hooking member may advantageously be formed by a guide protruding from the flap and the receiving member may advantageously be formed by a ramp bringing the guide into a cavity up to a final position corresponding to the retracted position of the flap. The cavity is advantageously successive to the ramp.

According to one form, the receiving member comprises a retaining spring provided to press the hooking member into the retracted position of the flap. More particularly, the retaining spring is disposed in the cavity of the receiving member. The retaining spring is advantageously formed by a blade. The retaining of the hooking member makes it possible to limit the vibrations of the flap in its retracted position and to inhibit the deployment of the flap in the event of breakage of the cable of the cable-pulley system.

According to another form, the ramp makes it possible to accompany the deployment or the retraction of the flap. From its retracted position, the guide of the flap is brought, by the displacement of the movable cowl, towards the ramp until it is disengaged from this ramp. The flap held by the cable of the pulley-cable system is then progressively released into the flow path. The deployment of the flap in the flow path is accompanied by the air flow present in the flow path. A flap whose deployment is accompanied by the air flow of the flow path is called scoop flap. In some cases, it may happen that the deployment of the flap in the flow path is inhibited by a greater differential pressure on the wall of the flap which forms the annular channel. In this latter case, the receiving member may comprise, besides the ramp, called the first ramp, a second ramp. The second ramp is advantageously separate from the first ramp. The receiving member is then advantageously successively formed of the first ramp of the cavity, and then of the second ramp.

From its retracted position, in the event of deployment of the flap in the flow path, the guide of the flap is brought by the displacement of the movable cowl towards the second ramp. The second ramp then makes it possible to separate the flap from the outer fixed structure to allow the air in the flow path to push on the outer surface of the flap until the guide is disengaged from this ramp. The flap held by the cable of the pulley-cable system is then progressively released into the flow path. The deployment of the flap in the flow path is accompanied by the air flow present in the flow path.

According to one form, the thrust reverser comprises a tensioner secured to the outer fixed structure and provided for tensioning the cable of the cable-pulley system when the flap is in the retracted position and for releasing the tension it exerts on the cable when the flap begins to deploy. The tensioner is then disposed on the path of the cable so that it is in contact with the cable when the flap is in the retracted position and that it is no longer in contact with the cable when the flap begins to deploy. The tensioner is advantageously a tensioner roller supported on the cable and pushed by an elastic spring.

According to another form, the diverter are movable diverter with the movable cowl, such as movable cascade vanes. When the diverter are movable diverter, the flap may be rotatably hinged with respect to the movable cowl. In other words, these movable diverter or movable cascade vanes are secured to the movable cowl. Thus, these movable diverter perform a translation with the movable cowl.

According to one form, the cable passes through a first deflection pulley and a second deflection pulley respectively securely mounted to the upstream and downstream ends of the movable diverter, and the cable further passing in a third deflection pulley secured to the flap.

According to another form, the diverter are diverter that are fixed relative to the outer fixed structure, such as fixed cascade vanes. When the diverter are fixed diverter, the flap may be rotatably hinged either relative to the movable cowl, or either relative to the outer fixed structure.

When the diverter are fixed diverter and when the flap is rotatably hinged relative to the outer fixed structure: according to a first form, the cable is connected at a first end to the downstream of the diverter and at a second end to the movable cowl, and the cable passes through a first deflection pulley and a second deflection pulley respectively securely mounted to the upstream end of the movable cowl, and the upstream end of the flap.

According to a second form, the flap is rotatably hinged relative to the outer fixed structure, the cable is connected at a first end to the upstream of the diverter and at a second end to the movable cowl, the cable passes through a first deflection pulley and a second deflection pulley respectively securely mounted to the upstream and downstream ends of the diverter, and the cable further passing in a third deflection pulley secured to the flap.

According to another form, the portion of the cable crossing the diverter passes through a rigid sheath secured to the diverter. Such a sheath makes it possible to avoid causing this portion of cable to vibrate when the flow of diverted air travels through these diverter.

According to yet another form, the present disclosure provides a nacelle of an aircraft equipped with a thrust reverser as described above.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 8C is a schematic view of the section of the thrust reverser of FIG. 8A in an opening position.

Figure 1:
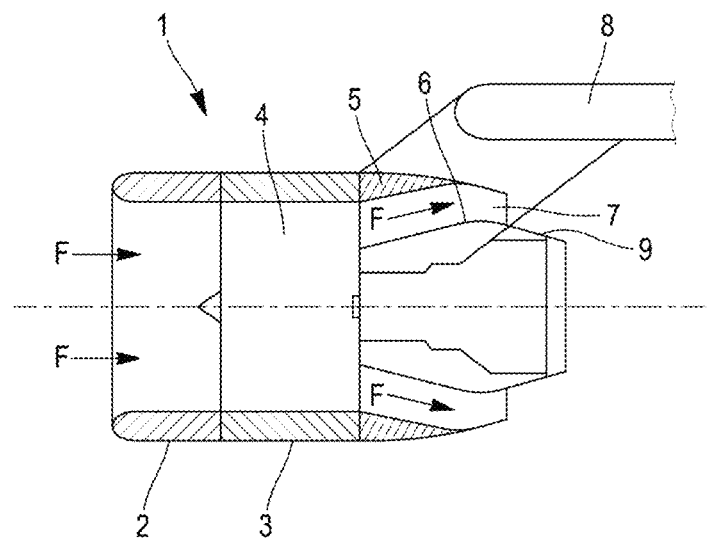
FIG. 1 is a cross-sectional view of a nacelle according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The expressions "upstream" and "downstream" refer to the direction of the flow of air crossing the air flow path.

Referring to FIG. 1, a nacelle 1 comprises an upstream section 2 with an air inlet lip, a middle section 3 surrounding a fan 4 of an engine such as a bypass turbojet engine 6 and a downstream section 5 accommodating a thrust reverser, the nacelle being configured to channel the air flow generated by the engine.

The air inlet allows improved capture towards the turbojet engine of the air desired to supply the fan and the inner compressors of the turbojet engine.

The downstream section 5 comprises for its part an inner structure (also called "inner fixed structure" or "IFS") surrounding the upstream portion of the turbojet engine, an outer structure (also called "outer fixed structure" or "OFS") and a movable cowl 14 including thrust reversal means. The inner structure or IFS as well as the outer structure or OFS are stationary relative to the movable cowl 14.

The IFS and the OFS delimit a flow path 7 allowing the passage of an air flow F penetrating the nacelle 1 at the air inlet lip.

The nacelle 1 is provided to receive an attachment pylon 8 allowing said nacelle 1 and the turbojet engine 6 to be fastened to a wing of the aircraft in a suspended manner.

The nacelle 1 terminates in an ejection nozzle 9.

Figure 2A:
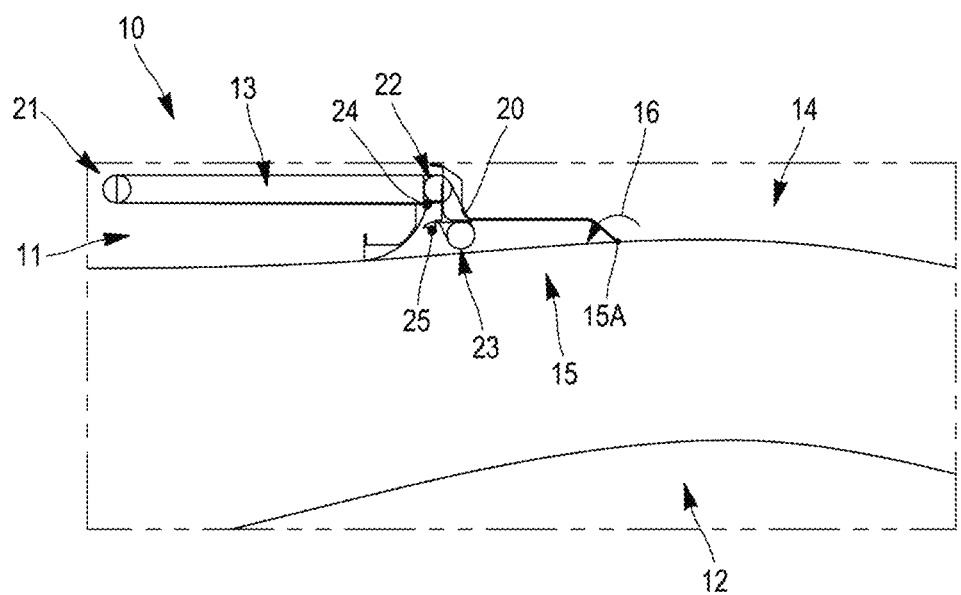
FIG. 2A is a schematic view of a section of a thrust reverser equipped with a cable-pulley system according to a first form represented in a closure position.
Figure 2B:
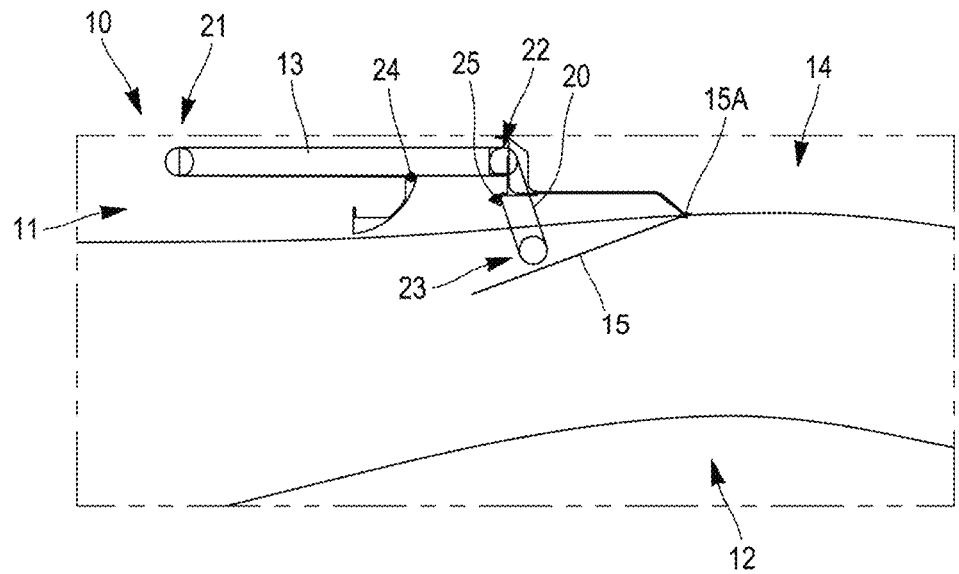
FIG. 2B is a schematic view of the section of the thrust reverser of FIG. 2A represented in a transit position.
Figure 2C:
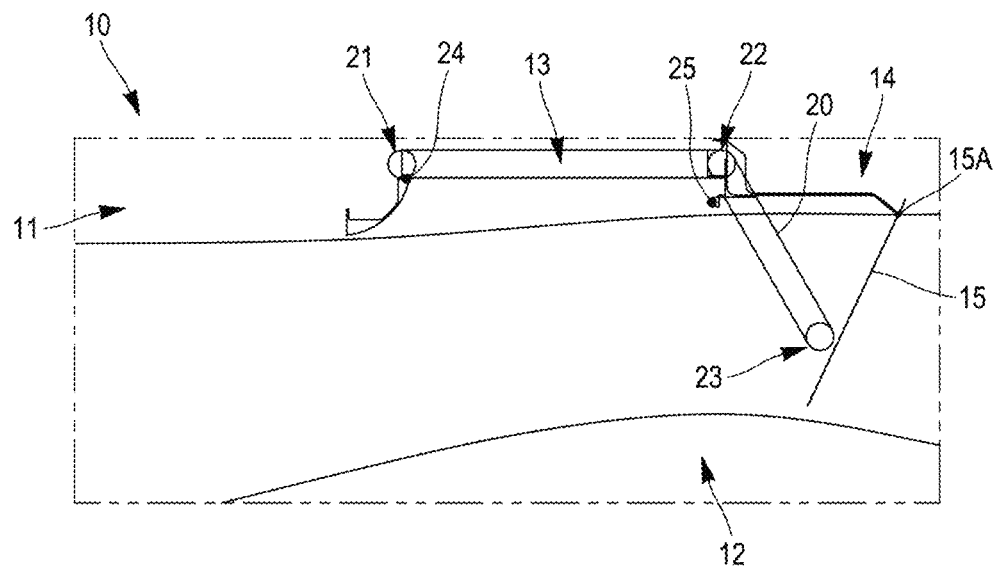
FIG. 2C is a schematic view of the section of the thrust reverser of FIG. 2A in an opening position.

In FIGS. 2A to 2C, a thrust reverser 10 has been partially represented according to a first form of the present disclosure. More particularly, in these figures, the outer fixed structure 11 of the thrust reverser 10 and the inner fixed structure 12 of the thrust reverser 10 are represented.

The outer fixed structure 11 is in aerodynamic continuity with the fairing of the nacelle, whereas the inner fixed structure 12 is in aerodynamic continuity with the fairing of the turbojet engine.

The thrust reverser 10 for a turbojet engine nacelle comprising means or a device for diverting the air flow from the turbojet engine, such as cascade vanes 13.

The movable cowl 14 is provided in translation relative to the outer fixed structure 11 of the thrust reverser 10. The thrust reverser 10 has at least one flap 15 rotatably hinged on the movable cowl 14. The movable cowl 14 being capable of moving alternately from a closure position in which it provides the aerodynamic continuity of the nacelle 1 with the flap 15 and covers the diverter 13, the flap 15 being in the retracted position, to an opening position in which it opens a passage in the nacelle 1 and uncovers the diverter 13, the flap obstructing a portion of an annular channel of the nacelle.

As represented, the diverter are movable cascade vanes 13 with the movable cowl 14.

According to the present disclosure, the thrust reverser 10 comprises a cable-pulley system 20-25 for driving the flap 15.

More particularly, in the illustrated example, the cable-pulley system 20-25 comprises a cable 20 associated with three pulleys 21-23 to connect the flap 15 to the thrust reverser 10.

The cable 20 is connected at a first end 24 to the outer fixed structure 11 and at a second end 25 to the movable cowl 14.

The cable 20 passes through a first deflection pulley 21 and a second deflection pulley 22 respectively securely mounted to the upstream and downstream ends of the movable diverter 13, and the cable 20 further passing through a third deflection pulley 23 secured to the flap 15.

FIG. 2A illustrates a closure position of the thrust reverser 10 in which the flap 15 is retracted. The cable 20 is then tensioned by the linear difference of the cable 20 between the first end 24 and the downstream deflection pulley 22.

In FIGS. 2B and 2C, the thrust reverser 10 begins its opening phase. The movable cowl 14 slides relative to the outer fixed structure 11 of the thrust reverser 10. The sliding of the movable cowl 14 then causes the displacement of the diverter 13 or cascade vanes 13 secured to the movable cowl 14. The displacement of the diverter 13 then makes it possible to progressively approach the upstream deflection pulley 21 to the first end 24 of the cable 20 secured to the outer fixed structure 11.

This progressive approach of the upstream deflection pulley 21 and the first end 24 makes it possible to release the tension initially applied to the cable 20 between the first end 24 of the cable 20 and the downstream deflection pulley 22.

The flap 15 then begins its deployment phase by progressively obstructing the air flow path.

The deployment of the flap 15 is promoted by the flow of air crossing the air flow path and penetrating a space formed between the flap 15 and the movable cowl 14 during the deployment of the flap 15.

In FIG. 2A, there is represented a torsion spring 16 of the flap 15 which may be disposed at the hinge 15A of the flap 15 with the movable cowl 14.

The torsion spring 16 is preferably dimensioned so that it allows the complete deployment of the flap 15 without flow of air crossing the air flow path.

Figure 3A:
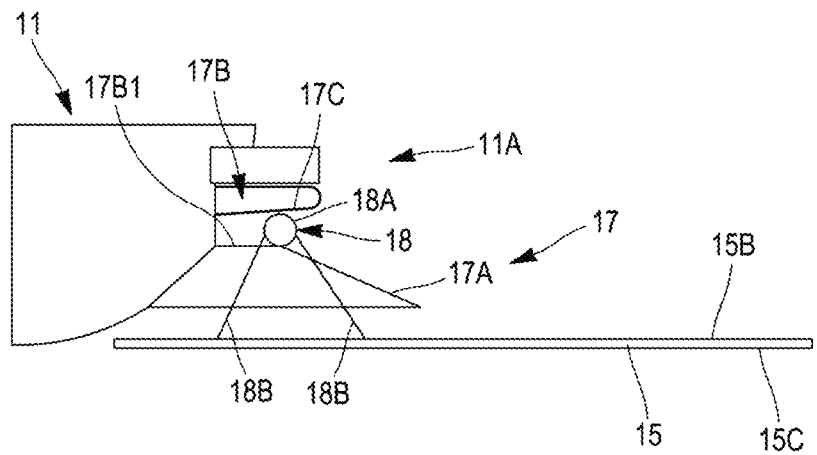
FIG. 3A is a schematic view of a diverting edge of an outer fixed structure of the thrust reverser equipped with a receiving member that receives a member for hooking a flap, represented in a closure position of the thrust reverser.
Figure 3B:
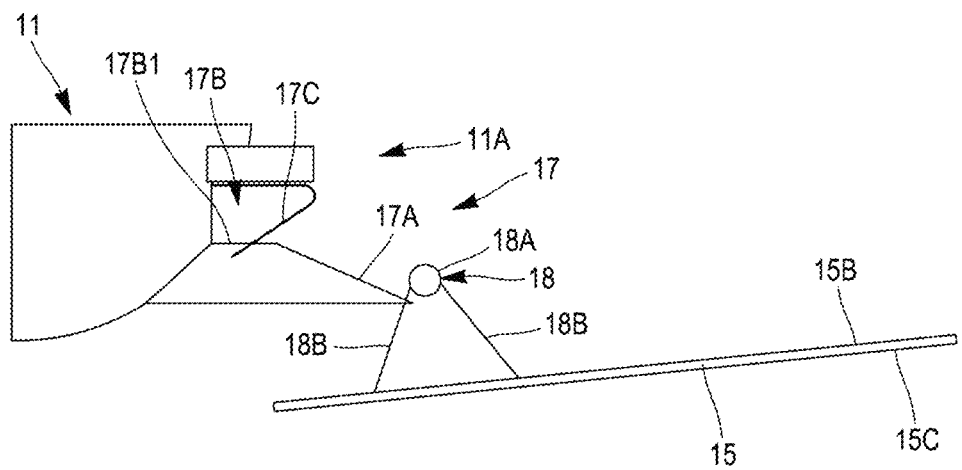
FIG. 3B is a schematic view of the flap of FIG. 3A in a transit position of the thrust reverser.

In FIGS. 3A and 3B, there is represented the downstream portion of the outer fixed structure 11 forming a diverting edge when the thrust reverser is in the opening position.

The downstream portion 11A of the outer fixed structure 11 comprises a receiving member 17 provided to guide a hooking member 18.

The receiving member 17 is advantageously formed on the upstream portion of the outer fixed structure 11 of the thrust reverser 10.

In the illustrated example, the receiving member 17 is successively formed of a ramp 17A joined to a straight portion 17B1 of a cavity 17B.

The cavity 17B advantageously forms an end-of-stroke angular stop of the flap from the deployed position to the retracted position.

The flap 15 comprises an aerodynamic surface 15C which forms the annular channel and an outer surface 15B not exposed to the air flow F when the flap is in the retracted position.

As represented, the hooking member 18 is disposed on the outer surface 15B of the flap 15. The hooking member 18 is formed by a guide 18A protruding from the outer surface 15B. More particularly, the guide 18A is carried by arms 18B protruding from the outer surface 15B.

The ramp 17A advantageously makes it easier to grip the flap 15 through the hooking member 18 when the thrust reverser 10 moves from its opening position to its closure position. The guide 18A of the gripped flap 15 is then brought to the cavity 17B.

The ramp 17A also makes it possible to progressively release the flap 15 by participating in the first percentage of the start of the transit phase of the thrust reverser 10. A sudden variation in the section of the air flow path in this start of transit phase. The flap 15 held by the cable 20 of the pulley-cable system 20-25 is then progressively released into the flow path. The deployment of the flap 15 in the flow path is accompanied by the air flow present in the flow path as previously described.

The receiving member 17 further comprises a spring 17D for retaining the guide 18A. The retaining spring 17D is herein formed by a blade. The retaining spring 17D is disposed in the cavity 17B of the receiving member 17.

The retaining of the hooking member 18 inhibits the deployment of the flap 15 in the event of breakage of the cable 20 of the cable-pulley system 20-25.

Figure 4A:
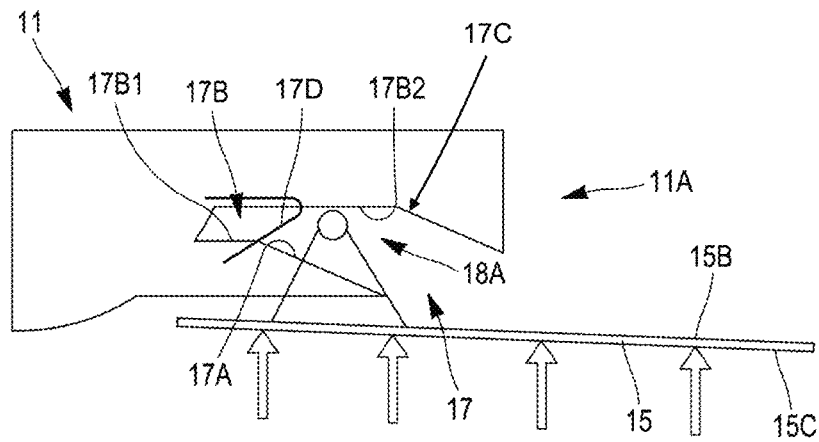
FIG. 4A is a schematic view of one form of the receiving member receiving the hooking member of the flap, represented in a first position of deployment of the thrust reverser.
Figure 4B:
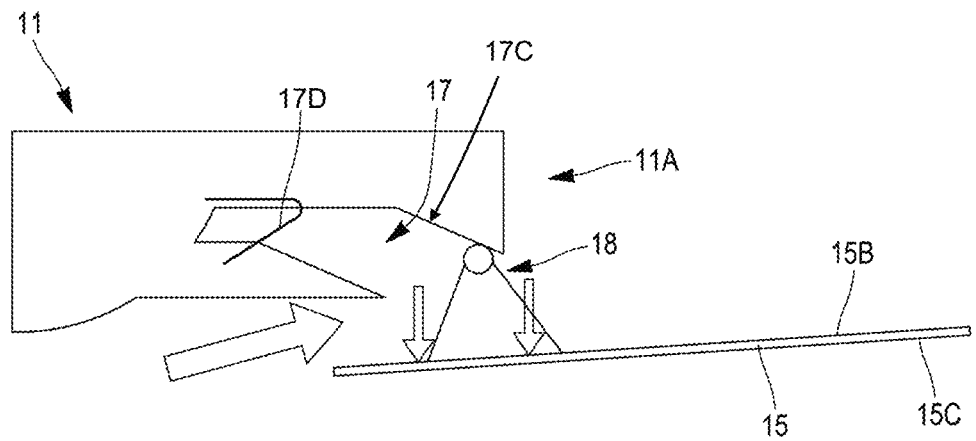
FIG. 4B is a schematic view of the thrust reverser of FIG. 4A, represented in a second deployment position of the thrust reverser.
Figure 4C:
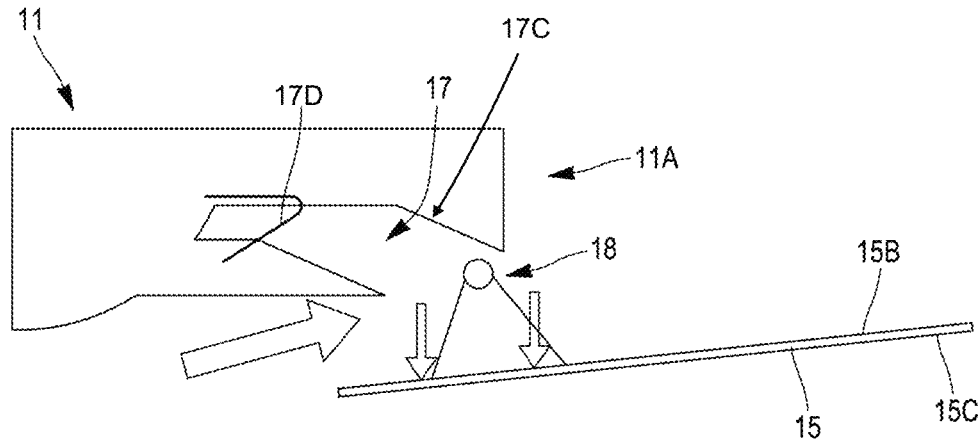
FIG. 4C is a schematic view of the thrust reverser of FIGS. 4A and 4B, represented in a third deployment position of the thrust reverser.

FIGS. 4A to 4C illustrate a form of the present disclosure configured to facilitate the deployment of the flap 15 in the flow path when its deployment is inhibited by a greater differential pressure on the aerodynamic surface 15C of the flap 15. In this case, the present disclosure provides that the receiving member comprises, besides the ramp 17A, called first ramp 17A, a second ramp 17C. The second ramp 17C is advantageously separate from the first ramp 17A.

According to this form, the receiving member 17 is then successively formed of the first ramp 17A, of the cavity 17B, and then of the second ramp 17C.

The second ramp 17C is opposite the first ramp 17A. According to one characteristic, a second straight portion 17B2 of the cavity 17B opposite to the first portion 17B1 may be of greater linear length than the first straight portion 17B1.

From its retracted position, in the event the flap 15 is inhibited from deployment in the flow path due to the fact that the flap 15 remains pressed by greater pressure on the aerodynamic surface 15C of the flap 15, the guide 18A of the flap 15 is brought by the displacement of the movable cowl 14 towards the second ramp 17C. The second ramp 17C then makes it possible to separate the flap 15 from the outer fixed structure 11 in order to allow the air in the flow path to come and push on the outer surface 15B of the flap 15 until the guide 18A is disengaged from this ramp 17C. The flap 15 held by the cable of the pulley-cable system 20-25 is then progressively released into the flow path. The deployment of the flap 15 in the flow path is accompanied by the air flow present in the flow path as illustrated in FIGS. 4A to 4C.

Figure 5A:
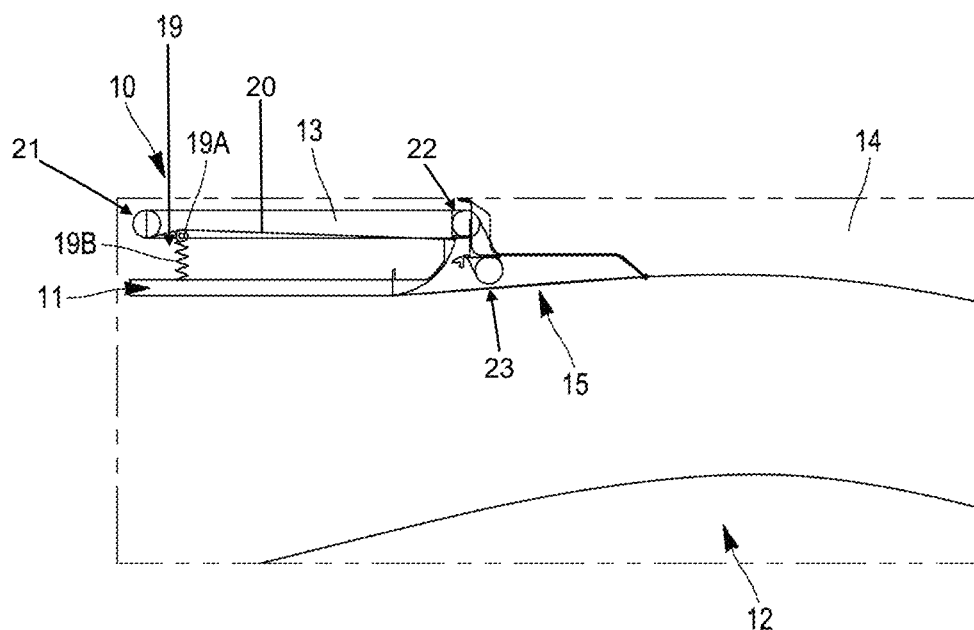
FIG. 5A is a schematic view of a tensioner tensioning the cable of the cable-pulley system.
Figure 5B:
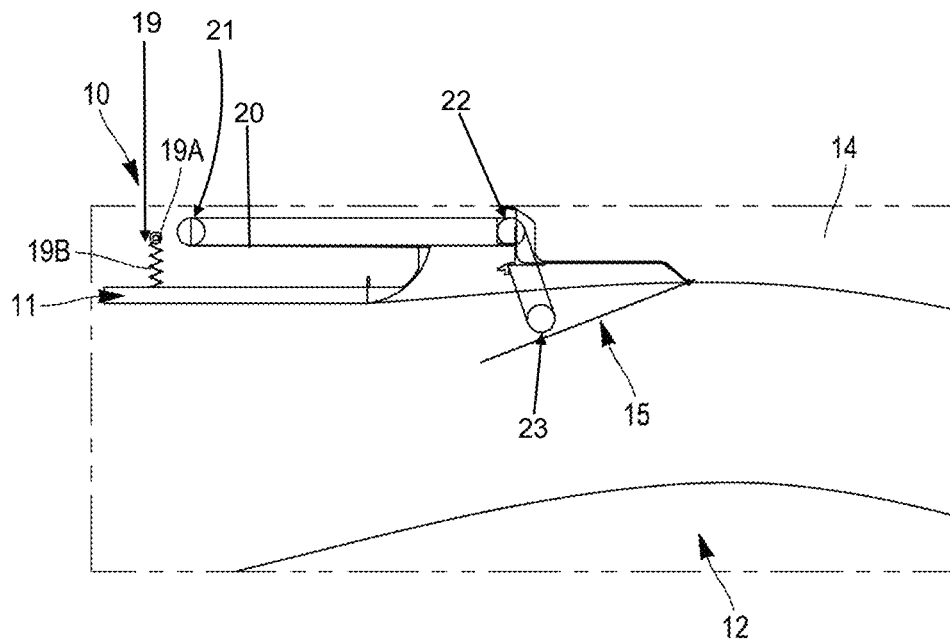
FIG. 5B is a schematic view of the tensioner of FIG. 5A releasing the tension of the cable of the cable-pulley system.

In FIGS. 5A and 5B, the thrust reverser 10 has been represented, the latter comprising a tensioner 19 secured to the outer fixed structure 11 and provided for tensioning the cable 20 of the cable-pulley system 20-25 when the flap 15 is in the retracted position and for releasing the tension it exerts on the cable 20 when the flap 15 begins to deploy.

As represented, the tensioner 19 is disposed in a fixed manner to the outer fixed structure 11 on the path of the cable 20 so that it is in contact with the cable 20 when the flap 15 is in the retracted position and that it is no longer in contact with the cable 20 when the flap begins its deployment.

As shown, the tensioner 19 is a tensioner roller 19A supported on the cable 20 and pushed by an elastic spring 19B.

The tensioner 19 advantageously tensions a portion of the cable 20 between the first upstream deflection pulley 21 and the second downstream deflection pulley 22.

Such a tensioner 19 allows the cable to be kept tensioned in the closure position of the thrust reverser so that the retracted position of the flap 15 is kept fixed and the cable does not vibrate.

Figure 6:
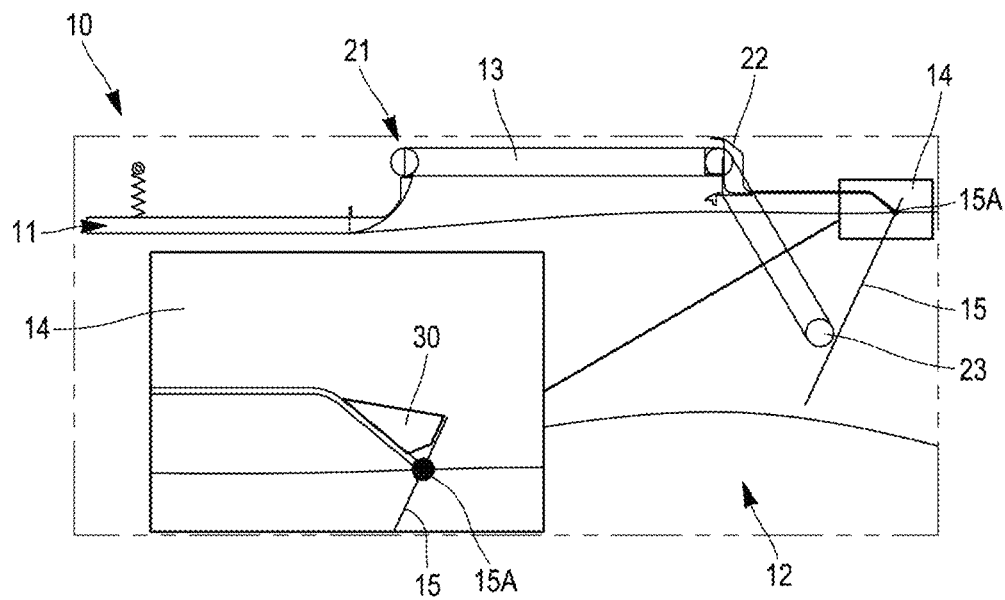
FIG. 6 is a schematic view of a stop disposed on the movable cowl to limit the stroke of the flap in the event of the breakage of the cable.

In FIG. 6, there is represented a stop 30 provided, in the event of breakage of the cable 20 during the thrust reversal phase, to limit the stroke of the flap 15 to its deployed position corresponding to the opening position of the thrust reverser.

Preferably, the stop 30 is disposed at the hinge 15A of the flap 15 with the movable cowl 14. The stop 30 is herein carried by the movable cowl 14.

Figure 7A:
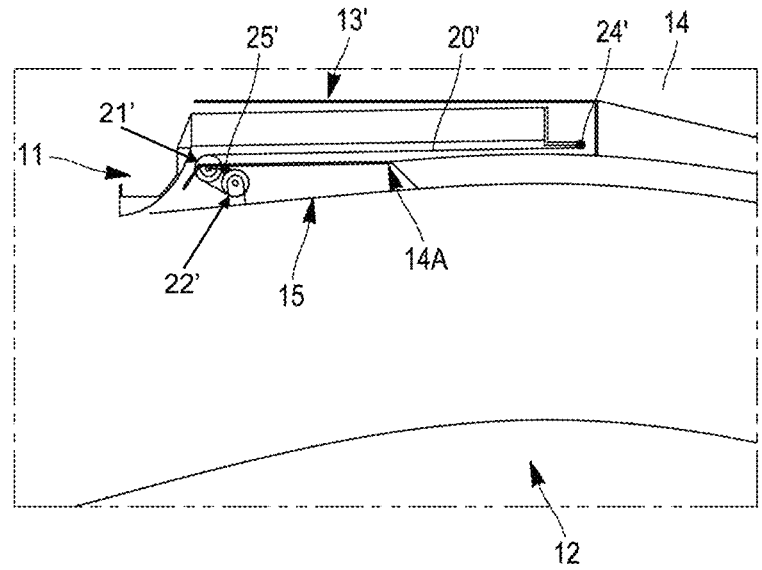
FIG. 7A is a schematic view of a section of a thrust reverser equipped with a cable-pulley system according to a second form represented in a closure position.
Figure 7B:
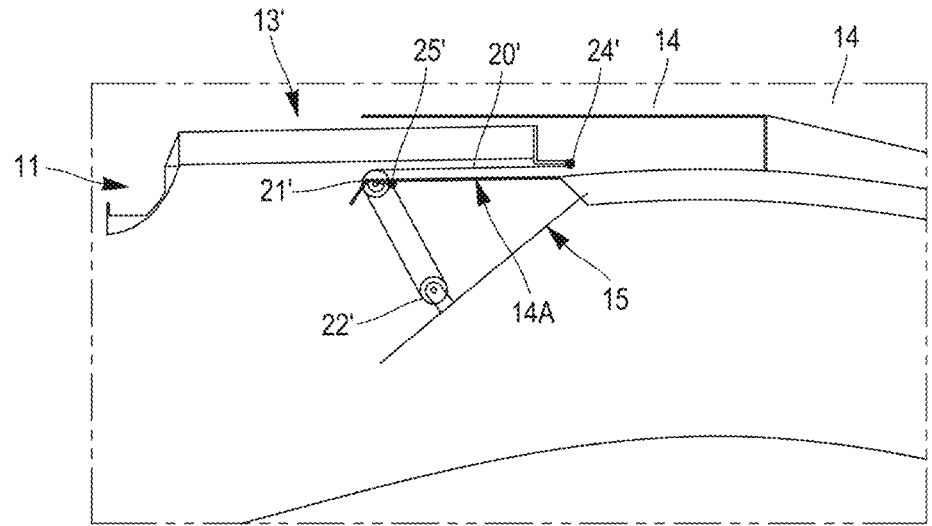
FIG. 7B is a schematic view of the section of the thrust reverser of FIG. 7A represented in a transit position.
Figure 7C:
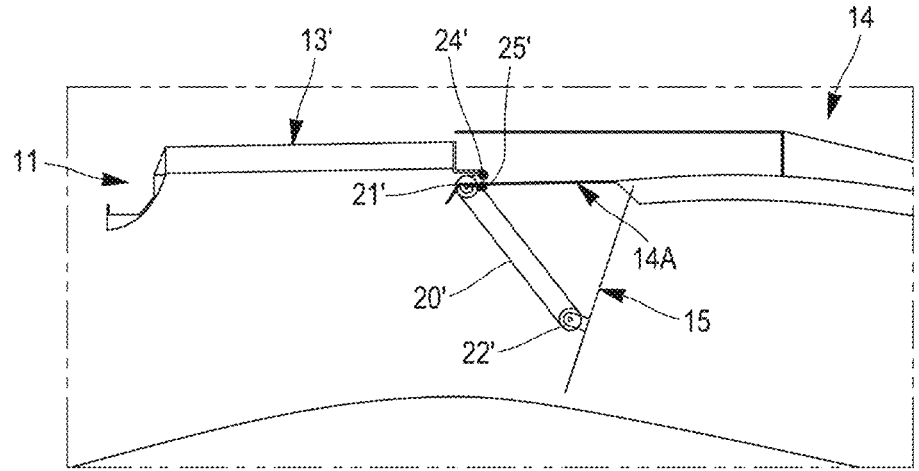
FIG. 7C is a schematic view of the section of the thrust reverser of FIG. 7A in an opening position.

In a second form represented in FIGS. 7A to 7C, the diverter 13' are fixed relative to the outer fixed structure 11, such as fixed cascade vanes 13'.

In this second form, the flap 15 is also rotatably hinged relative to the movable cowl 14.

According to this second form, a cable-pulley system 20-25' for driving the flap 15 is provided to be associated with fixed diverter 13'.

More particularly, in the illustrated example, the cable-pulley system 20'-25' comprises a cable 20' associated with two pulleys 21'-22' to connect the flap 15 to the thrust reverser 10.

The cable 20' is herein connected at a first end 24' to the downstream of the diverter 13' and at a second end 25' to the movable cowl 14, more particularly the cable 20' is connected at its second end 25" to the upstream of an acoustic shroud 14A of the movable cowl 14.

The cable 20' passes through a first deflection pulley 21" and a second deflection pulley 22' respectively securely mounted to the upstream end of the movable cowl 14, herein to the upstream of the acoustic shroud 14A, and to the upstream end of flap 15.

FIG. 7A illustrates a closure position of the thrust reverser 10 in which the flap 15 is retracted, the cable 20' is then tensioned by the linear difference of the cable 20' between the first end 24' and the deflection pulley 21' secured to the upstream end of the cowl 14.

In FIGS. 7B and 7C, the thrust reverser 10 begins its opening phase. The movable cowl 14 slides relative to the outer fixed structure 11 of the thrust reverser 10. The diverter 13' or cascade vanes 13" secured to the outer fixed structure 11 remain fixed. The displacement of the movable cowl 14 then makes it possible to progressively approach the deflection pulley 21" secured to the upstream end of the cowl 14 to the first end 24' of the cable 20" secured to the downstream of the diverter 13'. This progressive approach of the deflection pulley 21' secured to the upstream end of the cowl 14 and of the first end 24" makes it possible to release the tension initially applied to the cable 20' between the first end 24' of the cable 20' and the deflection pulley 21' secured to the upstream end of the cowl 14.

The flap 15 then begins its deployment phase by progressively obstructing the air flow path.

In the same manner as in the first form, the deployment of the flap 15 is promoted by the flow of air crossing the air flow path and penetrating a space formed between the flap 15 and the movable cowl 14 during the deployment of the flap 15.

The variant described with reference to the first form are of course applicable to the second form without departing from the scope of the second form.

In the case of the variant with reference to FIG. 5, the tensioner 19 may be secured to the diverter 13' and provided for tensioning the cable 20' of the cable-pulley system 20'-25' when the flap 15 is in the retracted position and for releasing the tension it exerts on the cable 20' when the flap 15 begins to deploy.

For example, the tensioner 19 advantageously tensions a portion of the cable between the first deflection pulley 21' and the first end 24' of the cable 20' secured to the downstream of the diverter 13'.

Such a tensioner 19 allows the cable to be kept tensioned in the closure position of the thrust reverser so that the retracted position of the flap 15 is kept fixed and the cable does not vibrate.

Figure 8A:
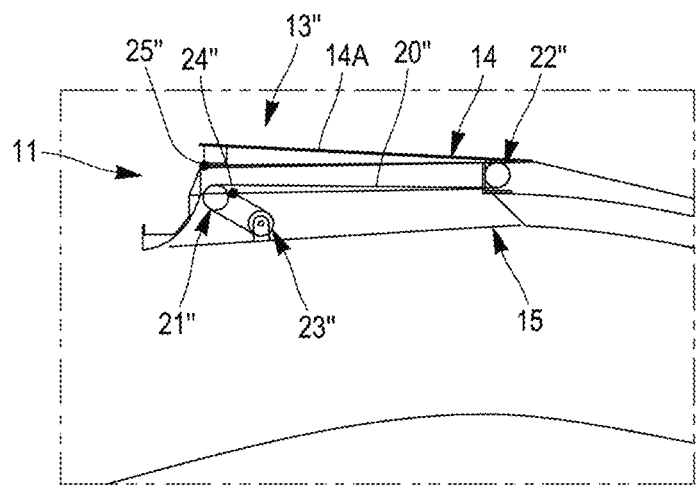
FIG. 8A is a schematic view of a section of a thrust reverser equipped with a cable-pulley system according to a third form represented in a closure position.
Figure 8B:
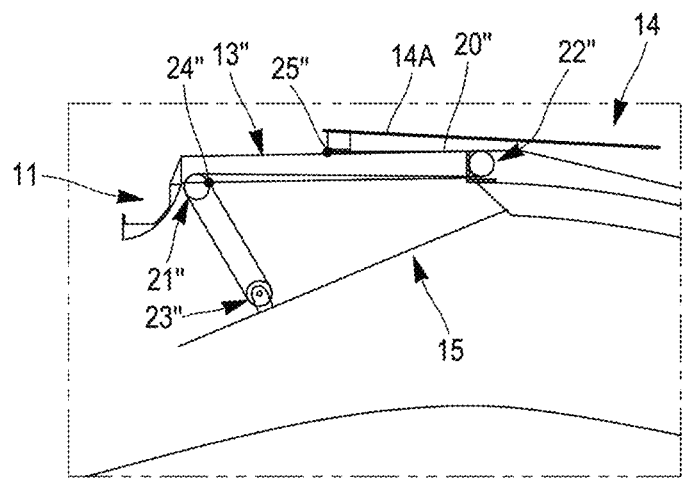
FIG. 8B is a schematic view of the section of the thrust reverser of FIG. 8A represented in a transit position.

In a third form represented in FIGS. 8A to 8C, the diverter 13" are also fixed relative to the outer fixed structure 11, such as fixed cascade vanes 13".

In this third form, the flap 15 is rotatably hinged relative to the outer fixed structure 11.

According to this third form, the cable-pulley system 20"-25" comprises a cable 20" associated with three pulleys 21"-23" to connect the flap 15 to the thrust reverser 10.

The cable 20" is herein connected at a first end 24" to the upstream of the diverter 13" and at a second end 25" to the movable cowl 14, more particularly the cable 20" is connected at its second end 25" to the upstream of an acoustic shroud 14A of the movable cowl 14.

The cable 20" passes through a first deflection pulley 21" and a second deflection pulley 22" respectively securely mounted to the upstream and downstream ends of the diverter 13", and the cable 20" further passing through a third deflection pulley 23" secured to flap 15.

FIG. 8A illustrates a closure position of the thrust reverser 10 in which the flap 15 is retracted, the cable 20" is then tensioned by the linear difference of the cable 20" between the second end 25" and the second deflection pulley 22" secured to the downstream end of the diverter 13".

In FIGS. 8B and 8C, the thrust reverser 10 begins its opening phase. The movable cowl 14 slides relative to the outer fixed structure 11 of the thrust reverser 10. The diverter 13" or cascade vanes 13" secured to the outer fixed structure 11 remain fixed. The displacement of the movable cowl 14 then makes it possible to progressively approach the second end 25" of the cable 20" secured to the upstream of the acoustic shroud 14A to the second deflection pulley 22" secured to the downstream end of the diverter 13".

This progressive approach of the second end 25" of the cable 20" towards the second deflection pulley 22" makes it possible to release the tension initially applied to the cable 20" increasing the cable length between the first pulley 21" and the third pulley 23". The flap 15 then begins its deployment phase by progressively obstructing the air flow path.

In the same manner as in the first form, the deployment of the flap 15 is promoted by the flow of air crossing the air flow path and penetrating a space formed between the flap 15 and the movable cowl 14 during the deployment of the flap 15.

The variants described with reference to the third form are of course applicable to the second form without departing from the scope of the third form.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A thrust reverser for a turbojet engine nacelle comprising:
    a diverter configured to divert at least a portion of an air flow from the turbojet engine nacelle; and
    at least one cowl movable in translation relative to an outer fixed structure of the thrust reverser,
    wherein the thrust reverser comprises at least one rotatably hinged flap, the at least one cowl being capable of moving alternately
    from a closure position in which it provides aerodynamic continuity of the nacelle with the at least one rotatably hinged flap and covers the diverter, the at least one rotatably hinged flap being in a retracted position,
    to an opening position in which it opens a passage in the nacelle and uncovers the diverter, the at least one rotatably hinged flap obstructs a portion of an annular channel of the nacelle when in the opening position, and
    wherein the thrust reverser comprises a cable-pulley system for driving the at least one rotatably hinged flap, the cable-pulley system comprising at least one cable associated with at least one pulley to connect the at least one rotatably hinged flap to the thrust reverser,
    wherein the at least one cable of the cable-pulley system is secured, at a first end, to the outer fixed structure and the at least one cable is secured, at a second end, to the at least one cowl.

2. The thrust reverser according to claim 1, wherein the cable-pulley system is mounted on the thrust reverser so as to tension the at least one cable when the at least one cowl is in the closure position and release the at least one cable when the at least one cowl begins moving towards the opening position.

3. The thrust reverser according to claim 1, wherein ends of the at least one cable and the at least one pulley of the cable-pulley system link together the fixed structure, the at least one cowl and the at least one rotatably hinged flap.

4. The thrust reverser according claim 1, wherein the at least one rotatably hinged flap is hinged at its downstream end.

5. The thrust reverser according to claim 1, further comprising a torsion spring, the torsion spring disposed at a hinge of the flap with the at least one cowl.

6. The thrust reverser according to claim 1, wherein the at least one cowl comprises a stop provided to limit a stroke of the at least one rotatably hinged flap to a deployed position of said at least one rotatably hinged flap corresponding to the opening position.

7. The thrust reverser according to claim 6, wherein the at least one rotatably hinged flap comprises a hooking member provided to engage with a receiving member of the outer fixed structure and provided to guide the stroke of the at least one rotatably hinged flap and lock the at least one rotatably hinged flap in the retracted position.

8. The thrust reverser according to claim 7, wherein the hooking member is formed by a guide protruding from an outer surface of the at least one rotatably hinged flap and in that the receiving member is formed by a ramp bringing the guide into a cavity up to a final position corresponding to the retracted position of the at least one rotatably hinged flap.

9. The thrust reverser according to claim 7, wherein the diverter is movable with the at least one cowl, the diverter being movable cascade vanes.

10. The thrust reverser according to claim 1, wherein the at least one cable passes through the at least one pulley among which a first deflection pulley and a second deflection pulley are securely mounted to upstream and downstream ends of the diverter, and the at least one cable also passing through a third deflection pulley of the at least one pulley secured to the at least one rotatably hinged flap.

11. A nacelle of an aircraft equipped with a thrust reverser according to claim 1.

12. A thrust reverser for a turbojet engine nacelle comprising:

a diverter configured to divert at least a portion of an air flow from the turbojet engine nacelle; and at least one cowl movable in translation relative to an outer fixed structure of the thrust reverser, wherein the thrust reverser comprises at least one rotatably hinged flap, the at least one cowl being capable of moving alternately from a closure position in which it provides aerodynamic continuity of the nacelle with the at least one rotatably hinged flap and covers the diverter, the at least one rotatably hinged flap being in a retracted position, to an opening position in which it opens a passage in the nacelle and uncovers the diverter, the at least one rotatably hinged flap obstructs a portion of an annular channel of the nacelle when in the opening position, and wherein the thrust reverser comprises a cable-pulley system for driving the at least one rotatably hinged flap, the cable-pulley system comprising at least one cable associated with at least one pulley to connect the at least one rotatably hinged flap to the thrust reverser, wherein the diverter is fixed relative to the outer fixed structure, and wherein the at least one cable of the cable-pulley system is secured, at a first end, to the diverter and the at least one cable is secured, at a second end, to the at least one cowl.

13. The thrust reverser according to claim 12, wherein the first end is connected to a downstream end of the diverter, and the at least one cable passes through a first deflection pulley and a second deflection pulley of the at least one pulley securely mounted to an upstream end of the at least one cowl and an upstream end of the at least one rotatably hinged flap, respectively.

14. The thrust reverser according to claim 12, wherein:
the at least one rotatably hinged flap is rotatably hinged relative to the outer fixed structure,
the first end is connected to an upstream end of the diverter, and the at least one cable passes through a first deflection pulley and a second deflection pulley of the at least one pulley securely mounted to upstream and downstream ends, respectively, of the diverter, and the at least one cable also passing through a third deflection pulley secured to the at least one rotatably hinged flap.

* * * * *